No. 895,576. PATENTED AUG. 11, 1908.
A. J. McCOLLUM.
INLET VALVE FOR GASOLENE MOTORS.
APPLICATION FILED DEC. 21, 1906. RENEWED DEC. 14, 1907.
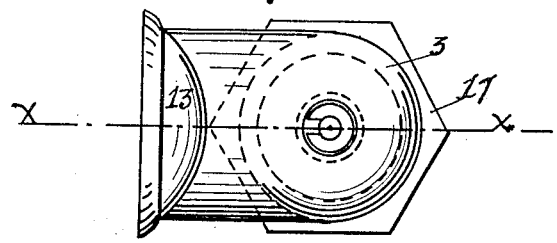
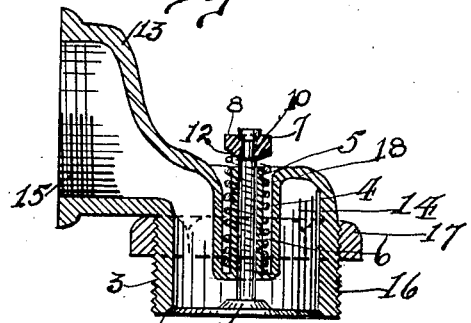
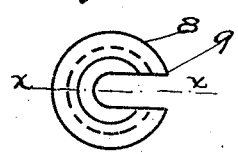
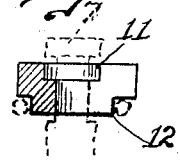
WITNESSES:
INVENTOR
Archibald J. McCollum
BY
Harry Leo Dodson
ATTORNEY

UNITED STATES PATENT OFFICE.

ARCHIBALD J. McCOLLUM, OF CHICAGO, ILLINOIS, ASSIGNOR TO ARMAC MOTOR COMPANY, OF CHICAGO, ILLINOIS, A CORPORATION OF ILLINOIS.

INLET-VALVE FOR GASOLENE-MOTORS.

No. 895,576.  Specification of Letters Patent.  Patented Aug. 11, 1908.

Application filed December 21, 1906, Serial No. 348,856. Renewed December 14, 1907. Serial No. 406,488.

*To all whom it may concern:*

Be it known that I, ARCHIBALD J. McCOLLUM, a citizen of the United States, residing at Chicago, in the county of Cook and State of Illinois, have invented certain new and useful Improvements in Inlet-Valves for Gasolene-Motors, of which the following is a specification.

My invention relates to that class of valves to which the carbureter is secured and has for its object to simplify the construction of the said inlet valve, reducing the number of working parts and providing for means to permit the use of any carbureter desired, and has for its further object the construction of certain details hereinafter specifically pointed out in this specification.

My means of accomplishing the foregoing objects may be more readily understood by having reference to the accompanying drawings, which are hereunto annexed and are a part of this specification, in which, Figure 1 is a top or plan view of my improved inlet valve. Fig. 2 is a cross section taken on the line $x$ $x$ in Fig. 1. Fig. 3 is an enlarged detail of my improved retaining washer. Fig. 4 is a cross section taken on the line $x$ $x$ in Fig. 3.

Similar reference numerals refer to similar parts throughout the entire description.

In the drawings, 1 is the inlet valve proper which is formed with a seat 2 fitted to the interior of the valve casing 3. This casing is formed with a downwardly depending tube or casing 4 which extends down into the interior of the casing 3 and is formed with an upwardly extending tubular wall 5, the interior of which is fitted to and forms a guide and bearing for the valve stem 6 of the valve 1. A shoulder 7 is formed at the upper part of the valve stem 6 serving to secure and hold in position my improved retaining washer 8. This washer is designed to take the place of and is an improvement on the spring cotter-pin which is usually employed in similar positions, and is designed to accomplish the result obtained by the use of a cotter pin in a much simpler manner and to be capable of ready detachment without the use of tools. It is constructed as better shown in the detail views with a slot 9 which should be made to coincide with the reduced portion 10 of the valve stem 6.

A recess 11 of the same diameter as the exterior of the valve stem 6 is formed at the top of the washer, a shoulder 12 being provided at the bottom whose external diameter conforms to the internal diameter of the coil spring 18 which the retaining washer 8 holds in position. This spring surrounds the upwardly extending tubular wall 5 and exerts a tension through the medium of the washer upon the valve stem, holding the valve closed under ordinary conditions. When it is desired to release the spring, the washer is pressed down, the valve stem then assuming the position indicated by the dotted lines in Fig. 4, when it is obvious that there is no engagement with any of the parts of the valve stem which would operate to prevent the washer from being removed by sliding it from the reduced part 10 of the valve stem through the slot 9, while when it is returned to position and the washer is slipped in place, the minute that it is released, the spring exerting an upward pressure on it, seats the head or shoulders 7 within the recess 11 so that the washer is held under all conditions firmly and securely in place and yet is capable of almost instant detachment and that without the use of any tools whatever.

The valve casing 3 is provided with an upwardly extending member 13 which has a passage extending therethrough and is in communication with the annular chamber 14 in the valve casing proper.

Internal threads 15 are provided in the member 13, in which may be mounted a carbureter, which may be of any desired construction, or any other form of mounting may be used. The lower part of the valve casing 3 is provided with external threads 16 upon which is mounted a lock-nut 17. This arrangement permits the shifting of the member 13 to any desired direction and permits the raising and lowering of the valve casing, thus providing for the various types of carbureters which, on account of their different sizes, may require the inlet casing located in various positions.

The construction of the guide or bearing in which the valve stem 6 is mounted permits of a great reduction in the height of the inlet valve casing and also of the valve stem thus lightening the valve without the sacrifice of bearing surface or the placing of the valve stem out of reach of the operator of the motor, should he desire to open it as a release valve at any time, besides providing a stop to regulate the opening of the valve.

Having described my invention, what I regard as new, and desire to secure by Letters Patent, is:

1. An inlet valve for gasolene motors formed of an elbow, the wall of which depends downwardly forming a tube or casing in the interior of the vertical portion and an inner tubular wall extending upwardly within said casing and formed integral therewith, there being an annular space between the two, a coil spring mounted in said annular space, the interior of the tubular wall furnishing a guide or bearing, said wall terminating within the elbow, a valve stem fitted to and slidable in said bearing, a valve at the lower part of said stem, means to engage the coil spring with the upper end of the valve stem, for the purpose set forth, substantially as described.

2. An inlet valve for gasolene motors formed of an elbow, the wall of which depends downwardly forming a tube or casing in the interior of the vertical portion, and an inner tubular wall extending upwardly within said casing and formed integral therewith, there being an annular space between the two, a coil spring mounted in said annular space, the interior of the tubular wall furnishing a guide or bearing, said wall terminating within the elbow, a valve stem fitted to and slidable in said bearing, said valve stem having a shoulder formed at its upper part, a retaining washer mounted in said shoulder to secure said coil spring in position, a valve at the lower part of said stem, means to engage the coil spring with the upper end of the valve stem, for the purpose set forth, substantially as described.

3. In an inlet valve for gasolene motors, the combination with a chamber, having a downwardly depending tube or casing in its interior and an upwardly extending tubular wall formed integral therewith, there being an annular space between the two, a coil spring mounted in said annular space, there being an opening through the central portion of the upwardly extending tubular wall, a valve stem fitted to and slidable in said opening, said valve stem having a shoulder formed on its upper part, a retaining washer mounted in said shoulder to secure said coil spring in position, said washer being formed with a slot coinciding with the reduced portion of the valve stem, a recess of the same diameter as the exterior of the valve stem in the top of the washer, a shoulder formed at the bottom of said washer, whose external diameter conforms to the internal diameter of the coil spring, for the purpose set forth, substantially as described.

4. An inlet valve for gasolene motors consisting of an elbow, internal threads cut in the horizontal member of the elbow, external threads cut upon the vertical portion of the elbow, a lock-nut mounted upon said threads, a tube or casing depending downwardly in the interior of said vertical portion, an upwardly extending tubular wall formed integral therewith, there being an annular space between the two, a coil spring mounted in said annular space, there being an opening through the center of the portion of the upwardly extending tubular wall, a valve stem fitted to and slidable in said opening, a valve at the lower part of said stem, said valve being seated against the lower part of the vertical portion, means to engage the spring with the upper part of the valve stem, for the purpose set forth, substantially as described.

ARCHIBALD J. McCOLLUM.

Witnesses:
  H. P. STEWART,
  B. F. HORSTING.